United States Patent [19]
Serbin

[11] Patent Number: 6,018,306
[45] Date of Patent: Jan. 25, 2000

[54] SCALABLE RANGE MIGRATION ALGORITHM FOR HIGH-RESOLUTION, LARGE-AREA SAR IMAGING

[75] Inventor: Evan B. Serbin, Los Angeles, Calif.

[73] Assignee: Raytheon Company, Lexington, Mass.

[21] Appl. No.: 09/137,720

[22] Filed: Aug. 21, 1998

[51] Int. Cl.[7] ................................................. G01S 13/90
[52] U.S. Cl. ........................... 342/25; 342/175; 342/192; 342/195; 342/196
[58] Field of Search ............................. 342/25, 175, 192, 342/193, 194, 195, 196, 197

[56] References Cited

U.S. PATENT DOCUMENTS 4,471,357   9/1984   Wu et al. ................................... 342/25

OTHER PUBLICATIONS

Alan E. Charlesworth et al., "Introducing Replicated VLSI to Supercomputing: the FPS–164/MAX Scientific Computer"; IEEE Computer magazine; Mar., 1986; posted on Internet at www.scl.ameslab.gov.

*Primary Examiner*—Bernarr E. Gregory
*Attorney, Agent, or Firm*—Leonard A. Alkov; Glenn H. Lenzen, Jr.

[57] ABSTRACT

An improved range migration algorithm or processing method that advantageously performs digital synthetic aperture radar image formation processing. The range migration algorithm provides high-resolution, large-area spotlight SAR imaging that is free from phase and gain discontinuities and geometric distortions. The range migration algorithm also provides for truly scalable and portable processing. The range migration algorithm may be used in a real-time implementation on a multi-processor platform. The range migration algorithm of the present invention does not perform range deskew, which results in more efficient processing and the imaging of very large swath widths. In addition, the range migration algorithm explicitly and efficiently treats the residual video phase term. Also, no overcollection of input data is required.

20 Claims, 4 Drawing Sheets

FIG. 5

→ SUBBAND FILTER FFT

↓ AOUTPUT FILTER

| 0,0 | 0,1 | 0,2 | ••• |
|-----|-----|-----|-----|
| 1,0 | 1,1 | 1,2 | ••• |
| 2,0 | 2,1 | 2,2 | ••• |
| ⋮ | ⋮ | ⋮ | ⋮ |

FIG. 6

→ AZIMUTH

↓ RANGE

| 0,0 | 0,1 | 0,2 | ••• |
|-----|-----|-----|-----|
| 1,0 | 1,1 | 1,2 | ••• |
| 2,0 | 2,1 | 2,2 | ••• |
| ⋮ | ⋮ | ⋮ | ⋮ |

FIG. 7

→ RANGE

↓ AZIMUTH

| 0,0 | 0,1 | 0,2 | ••• |
|-----|-----|-----|-----|
| 1,0 | 1,1 | 1,2 | ••• |
| 2,0 | 2,1 | 2,2 | ••• |
| ⋮ | ⋮ | ⋮ | ⋮ |

FIG. 8

|  | SUBBAND FILTER FFT | | | |
|---|---|---|---|---|
| AOUTPUT FILTER | 0,0 | 0,1 | 0,2 | ••• |
| | 1,0 | 1,1 | 1,2 | ••• |
| | 2,0 | 2,1 | 2,2 | ••• |
| | ⋮ | ⋮ | ⋮ | ⋮ |

FIG. 9

|  | RANGE | | | |
|---|---|---|---|---|
| AZIMUTH | 0,0 | 0,1 | 0,2 | ••• |
| | 1,0 | 1,1 | 1,2 | ••• |
| | 2,0 | 2,1 | 2,2 | ••• |
| | ⋮ | ⋮ | ⋮ | ⋮ |

SCALABLE RANGE MIGRATION ALGORITHM FOR HIGH-RESOLUTION, LARGE-AREA SAR IMAGING

BACKGROUND

The present invention relates generally to synthetic array radar imaging systems, and more particularly, to an improved scaleable range migration algorithm for use in high-resolution, large-area synthetic array radar imaging systems.

Traditional synthetic array radar (SAR) image formation processors for high-resolution imaging have employed a classic polar format algorithm (PFA). The image must be sufficiently small so that performance issues (range walk, defocusing and geometric distortion) are within tolerable limits, which is known as the depth-of-field (or depth-of-focus). Large-area imaging is handled by breaking up the scene into smaller subimages, processing each subimage with its own center point, and piecing the resulting subimages together as well as possible.

The polar format algorithm does not provide for a truly scalable implementation. Real-time processing is achieved by designing subimage sizes that are matched to a given number of processing nodes and creating specialized, efficient software. The number of nodes dictated the design of the software. Each processing platform requires a tailored implementation, and this led to non-portable software.

More particularly, disadvantages of the polar format algorithm approach are: (1) discontinuities across the subimage boundaries, and (2) lack of true processing scalability. Discontinuities are undesirable for image exploitation algorithms such as interferometric SAR and coherent change detection. Lack of true scalability makes it difficult to assign the subimages to the processing nodes so that load balancing is achieved. Optimal balancing usually requires an integral number of subimages per processing node.

Adding more processing nodes, with the intent of speeding up the processing to real time, may entail the redesigning of subimage sizes so that optimal load balancing is once again achieved. This is a very difficult problem to solve if one desires a processing approach that employs parameter-driven software. The same software must run on any number of nodes by simply changing a few parameters (which is the definition of scalable processing).

The basic range migration algorithm is described in a book entitled Spotlight SAR by Carrara et al, is representative of a class of SAR imaging algorithms that are called wavenumber domain techniques. In theory, the range migration algorithm performs large-area imaging without having to break up the scene into smaller subimages, and it provides for scalable and portable processing. However, the range migration algorithm requires a special computationally-intensive preprocessing step known as range deskew. This preprocessing synchronizes (in time) the radar returns from multiple point targets, and it also eliminates the residual video phase (RVP) term in the input phase history. Synchronizing the returns is not desirable for the imaging of very large swath widths.

Accordingly, it is an objective of the present invention to provide for an improved scalable range migration algorithm for use in high-resolution, large-area synthetic array radar imaging systems. It is a further objective of the present invention to provide for an improved scalable range migration algorithm that overcomes the limitations of the classic range migration algorithm.

SUMMARY OF THE INVENTION

To meet the above and other objectives, the present invention provides for an improvement to the basic range migration algorithm or processing method, and is an algorithm that performs digital SAR (synthetic aperture radar) image formation processing. The range migration algorithm provides high-resolution, large-area spotlight SAR imaging which is free from phase and gain discontinuities and geometric distortions. The range migration algorithm also provides for truly scalable and portable processing. The range migration algorithm may be used in a real-time implementation on a multi-processor platform.

An exemplary scalable range migration processing method comprises the following steps. Video phase history data is input for processing that corresponds to a two-dimensional array of complex-valued input data, comprised of pulses by samples. The video phase history data is processed using an along-track Fourier transform to convert the input video phase history data to wavenumber space. The data is processed using a phase adjustment to apply a predetermined phase adjustment function to the data. The data is processed using a global matrix transpose to rearrange the data to produce values of range for a fixed value of azimuth. The data is processed using range subband processing to produce range pixels. The data using a global matrix transpose to rearrange the data to produce values of azimuth for a fixed value of range. The data using azimuth subband processing to produce azimuth pixels. Image data is output from the range migration algorithm to form a synthetic aperture radar image.

The range subband processing comprises processing the data using range subband processing that separates the swath width into range subbands, adjusts the phase of the data, determines a range pixel spacing, produces range pixels, and equalizes the phase and gain of the range pixels. The azimuth subband processing comprises processing the data using azimuth subband processing that separates the patch width into azimuth subbands, adjusts the phase of the data, determines an azimuth pixel spacing, produces azimuth pixels, and equalizes the phase and gain of the azimuth pixels.

The improved range migration algorithm of the present invention does not perform range deskew. This results in more efficient processing and an unrestricted swath width. In addition, the range migration algorithm explicitly and efficiently treats the residual video phase term. Also, unlike the basic range migration algorithm, no overcollection of input data is required for the present range migration algorithm.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which

FIG. 5 shows a matrix representation of data after a subband filtering step of the algorithm of FIG. 1 for each value of azimuth;

FIG. 6 shows a matrix representation of data at the end of range processing performed by the algorithm of FIG. 1;

FIG. 7 shows a matrix representation of data after a second corner turn step of the algorithm of FIG. 1;

FIG. 8 shows a matrix representation of data after a second subband filtering step of the algorithm of FIG. 1 for each value of range; and FIG. 9 shows a matrix representation of data at the end of azimuth processing and which corresponds to the output image data from the range migration algorithm of FIG. 1.

DETAILED DESCRIPTION

Figure 1:
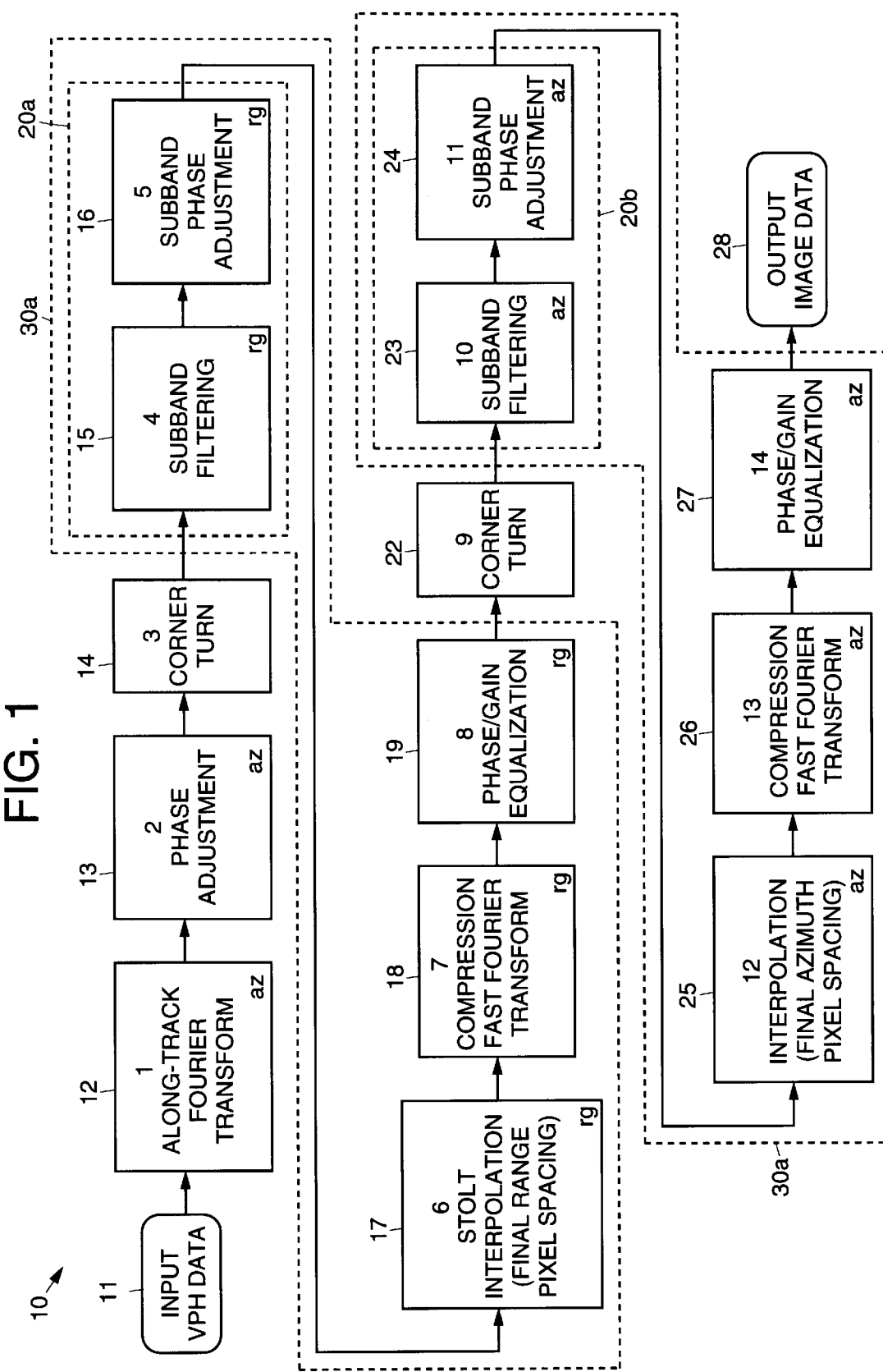
FIG. 1 is a flow diagram illustrating process flow of an exemplary range migration algorithm in accordance with the principles of the present invention.

The data processing flow of a range migration algorithm 10 or processing method 10 in accordance with the principles of the present invention is shown in FIG. 1. Each box illustrated in FIG. 1 is representative of a specific processing step. The symbol at the lower right-hand corner of each box denotes the direction of the processing: rg signifies processing along the range (cross-track) direction for a fixed value of azimuth, and az signifies processing along the azimuth (along-track) direction for a fixed value of range. The corner turn boxes each correspond to a global matrix transpose.

The range migration algorithm 10 provides for several improvements over the basic range migration algorithm. In the present range migration algorithm, (1) the computationally-intensive range deskew preprocessing is not performed, (2) the residual video phase term is explicitly and efficiently treated, and (3) no overcollection of input data is required. In the improved range migration algorithm of the present invention, the residual video phase term is treated as a perturbation. In the computation of the phase, where accuracy is paramount, linear terms in the coefficient of the residual video phase term are retained.

Figures 2, 3, 4:
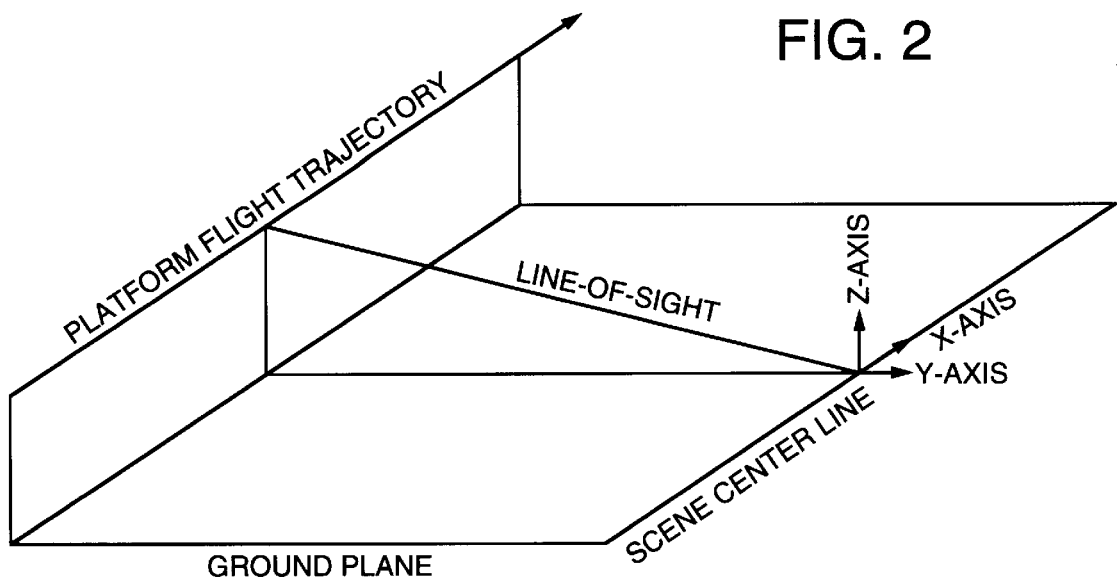
FIG. 2 shows a operational scenario for a synthetic array radar platform employing the algorithm of FIG. 1.
FIG. 3 shows a matrix representation of VPH input data supplied to the algorithm of FIG. 1.
FIG. 4 shows a matrix representation of data after a first corner turn step of the algorithm of FIG. 1.

By way of introduction, as shown in FIG. 2, a radar platform is assumed to be flying a straight and level trajectory. The spotlight collection geometry is broadside; that is, the platform velocity vector (along-track) is approximately perpendicular to the line-of-sight (antenna illumination). The scene center line (about which the output image is formed) lies on the ground and is parallel to the platform flight trajectory. The reference range is the fixed distance between these two parallel lines. A particular point on the scene center line is chosen to be the origin of a three-dimensional orthonormal (X,Y,Z) coordinate system.

Input VPH (video phase history) data 11 (FIG. 1) is formed by demodulating the received phase history with the reference phase history which is based on the reference range. The data 11 is sampled at an A/D (analog/digital) sampling frequency during which time the radar platform is assumed to be at a specific point in the flight trajectory. The resulting set of samples constitutes one pulse and represents one row of data 11. The radar platform travels a fixed distance from point to point along the flight trajectory; at each point, a new pulse is collected. As the platform moves, the direction of the line-of-sight slowly changes (and therefore the range from the platform to the target slowly varies) but the reference range remains constant. In this manner, a two-dimensional array of complex-valued input data is gradually accumulated.

Since an actual radar platform cannot fly a perfect trajectory (that is, straight and level), motion compensation preprocessing is performed on the input VPH data 11. The dynamics of the flight trajectory are obtained from the platform navigation data. Also, with sufficient accuracy, a squinted (non-broadside) spotlight collection geometry can be transformed into a broadside geometry. It is assumed the required motion compensation has already been performed prior to processing using the range migration algorithm 10.

The input VPH data 11, written as a function of two variables, is $$S(X,K_R)=e^{i\Phi(X,K_R)}$$

where $$i = \sqrt{-1}$$

Without loss of generality, the amplitude of the target is set to unity. Since the image formation processing is linear, the analysis of a single target (of unit amplitude) is sufficient. $\Phi(X,K_R)$ is the input phase history. The equation is $$\Phi(X,K_R)=-K_R(R_t-R_s)+\mu(R_t-R_s)^2$$

where $$K_R = \frac{4\pi}{c}\left[f + \gamma\left(t - t_n - \frac{2R_s}{c}\right)\right]$$

$$R_t = \sqrt{(X - X_t)^2 + R_B^2}$$

$$R_B = R_s + \Delta R$$

and $$\mu = \frac{4\pi\gamma}{c^2}$$

The sampling window is $$-\frac{1}{2}\left(\frac{2}{c}SW + PW\right) \leq t - t_n - \frac{2R_s}{c} \leq +\frac{1}{2}\left(\frac{2}{c}SW + PW\right)$$

In the above equations, $X_t$ and $\Delta R$ are, respectively, the along-track and cross-track coordinates of the target (relative to the origin of the three-dimensional orthonormal coordinate system). The variable X is the along-track coordinate of the platform, $R_t$ is the range from the platform to the target (slowly varies from pulse to pulse), and $R_s$ is the reference range (the fixed distance between the platform flight trajectory and the scene center line). The quantity $t_n$ is the absolute time corresponding to the center of the transmitted pulse, and $t-t_n$ is the relative time with respect to the center of the pulse (n is the pulse index). The variable $K_R$ is the range spatial frequency (in units of radians per length) and is always positive. The absolute time t is sampled at equally-spaced values and is centered about the value $$t = t_n + \frac{2R_s}{c}.$$

The quantity SW represents the swath width in range (in units of length) and PW is the pulse width (sec). The parameters c, f and γ respectively denote the speed of light (in units of length per sec), carrier (center) frequency (Hz) and chirp (linear FM) slope (Hz per sec). The quantity ju is the coefficient of the residual video phase term, which is the second term in the equation for $\Phi(X,K_R)$.

Each pulse of the VPH data 11 is sampled by making the substitution $$t - t_n - \frac{2R_s}{c} = \frac{n - \frac{N_r - 1}{2}}{F_s}$$

where n is the sample index, $N_r$ is the number of samples, and n=0,1, . . . , $N_r$−1. The A/D sampling frequency is denoted $F_s$.

Referring again to FIG. 1, input VPH data 11 represents the two-dimensional array of complex-valued input data, comprised of $N_{pulse}$ pulses by $N_r$ samples. The number of pulses covers the synthetic array (integration) length and the number of samples covers the swath width plus pulse width. The actual values are dependent on the desired resolution and area coverage. FIG. 3 shows the matrix representation of the data. The ordered pair of indices identifies the data: the first is the pulse (azimuth) index and the second is the sample (range) index.

Step 1

The first processing step in the range migration algorithm 10 is an along-track Fourier transform 12, which converts the input VPH data 11 to wavenumber space. Each sample is integrated along the pulses, that is, along the azimuth direction (X) for a fixed value of range ($K_R$). The columns of the matrix shown in FIG. 3 are individually processed.

The along-track Fourier transform 12 is described by the equation $$F(K_X, K_R) = \int_{-L/2}^{L/2} S(X, K_R) e^{-iK_X X} dX$$

where L is the integration length. The integral is evaluated using the principle of stationary phase. For certain values of the output variable $K_X$, the result of the integration is non-zero and is given by $$F(K_X, K_R) = A(K_{X,KR}) e^{i\Phi(K_X, K_R)}$$

where $$A(K_X, K_R) = \sqrt{\frac{2\pi K_R^2 R_B}{(K_R^2 - K_X^2)^{\frac{3}{2}}}}$$

$$\Phi(K_X, K_R) = -X_t K_X + R_s K_R - R_B \sqrt{K_R^2 - K_X^2} - \frac{2\mu R_B R_s K_R}{\sqrt{K_R^2 - K_X^2}} + \frac{\mu R_B^2 K_R^2}{K_R^2 - K_X^2} + \mu R_s^2$$

It will be noted that linear terms in the coefficient of the residual video phase term $\mu$ are retained in the output phase history $\Phi(K_X, K_R)$. Also, the range and azimuth coordinates are decoupled.

For the result to be non-zero, the output variable $K_X$ must lie within the interval $$\frac{K_R\left(X_t - \frac{L}{2}\right)}{R_B} \leq K_X \leq \frac{K_R\left(X_t + \frac{L}{2}\right)}{R_B}$$

When $K_X$ lies outside these limits, the result is zero. The difference of the limits of $K_X$ gives the extent of data in wavenumber space and yields $$\frac{K_R L}{R_B}.$$

The integration length L and the pulse width PW are chosen to guarantee enough non-zero data in wavenumber space; these quantities will be dependent on the desired resolution and area coverage. Using this value of L, the number of pulses $N_{pulse}$ is computed.

Step 2

A phase adjustment step 13 applies a target-independent phase adjustment function. The adjusted phase history reduces to zero when the target coordinates are zero.

The phase adjustment function is obtained from the above equation for $\Phi(K_X, K_R)$. First set $X_t$=0 and $R_B$=$R_s$ (i.e. $\Delta R$=0), and then conjugate (i.e. negate) the terms. The equation is $$\Delta\Phi(K_X, K_R) = -R_s K_R + R_s \sqrt{K_R^2 - K_X^2} + \frac{2\mu R_s^2 K_R}{\sqrt{K_R^2 - K_X^2}} + \frac{\mu R_s^2 K_R^2}{K_R^2 - K_X^2} + \mu R_s^2$$

A partial amplitude removal is performed, accomplished with the factor $$\sqrt{\frac{(K_R^2 - K_X^2)^{\frac{3}{2}}}{2\pi K_R^2}}$$

The phase adjustment yields the adjusted phase history $$\Psi(K_X, K_R) = \Phi(K_X, K_R) + \Delta\Phi(K_X, K_R)$$

$$= -X_t K_X - \Delta R \sqrt{K_R^2 - K_X^2} - \frac{2\mu R_s \Delta R K_R}{\sqrt{K_R^2 - K_X^2}} +$$

$$\frac{2\mu R_s \Delta R K_R^2}{K_R^2 - K_X^2} + \frac{\mu \Delta R^2 K_R^2}{K_R^2 - K_X^2}$$

and adjusted amplitude $$\sqrt{R_B}$$

The last term in the adjusted phase history can, without committing significant error, be replaced by the constant value $\mu\Delta R^2$ (as though $K_X$=0), and the adjusted phase history is $$\Psi(K_X, K_R) =$$

$$-X_t K_X - \Delta R \sqrt{K_R^2 - K_X^2} - \frac{2\mu R_s \Delta R K_R}{\sqrt{K_R^2 - K_X^2}} + \frac{2\mu R_s \Delta R K_R^2}{K_R^2 - K_X^2} + \mu\Delta R^2$$

For each fixed value of $K_R$, the phase adjustment is performed along the $K_X$ variable.

Step 3

The along-track Fourier transform 12 and phase adjustment 13 produce all values of azimuth for a fixed value of range, but range processing (steps 4 to 8 below) requires all values of range for a fixed value of azimuth. In other words, steps 1 and 2 produce all values of $K_X$ for a fixed value of $K_R$, but steps 4 to 8 require all $K_R$ for a fixed $K_X$. A corner turn (global matrix transpose) 14 performs the necessary data shuffling. Rows become columns and vice versa. FIG.

4 shows a matrix representation of the data after the corner turn 14. The ordered pair of indices identifies the data: the first is the sample (range) index and the second is the pulse (azimuth) index. The columns of this matrix are individually processed in steps 4 to 8.

Range processing 30a is implemented in the next five steps. Range subband processing 20a is one improvement provided by the present invention and involves subband filtering 15 and subband phase adjustment 16 identified as steps 4 and 5.

Step 4

The subband filtering 15 separates the entire swath width (in range) into smaller pieces referred to range subbands. This is necessary for the following reasons: (1) the range of valid (i.e. non-zero) samples drifts as the range target coordinate ($\Delta R$) varies, and (2) the input signal may not be bandlimited. FIG. 5 shows the matrix representation of the data after the subband filtering 15 for each value of azimuth. The ordered pair of indices identifies the data: the first is the output sample index and the second is the subband filter FFT index. A range frequency shift may be appended; with the addition of this frequency shift, the subband filtering FFT is indexed beginning with the output filter at dc.

Each range subband is tuned to a specific value of $\Delta R$, the value at the center of the subband. Consecutive subbands are separated by $SB_r$. The equations are $$\Delta R = SB_r\left(s - \frac{NSB_r - 1}{2}\right)$$

$$SB_r = \frac{cF_s}{2\gamma NFFTSB_r}$$

where $NFFTSB_r$ is the size of the range subband filter FFT, $NSB_r$ are the number of subbands, and the subband index is $s=0,1,\ldots,NSB_r-1$.

Corresponding to each range subband is a set of valid output samples. Each subband is identified by a particular subband index, and the corresponding range of valid samples can be computed and extracted for further processing. The valid sample selection tables are computed based on the fact that near-range target energy is received before far-range target energy.

Step 5

A subband phase adjustment 16 represents a correction that must be applied to outputs of the subband filtering 15. The corrected phase history is in a form suitable for Stolt interpolation 17. The subband phase adjustment function is different for each range subband.

The equation for the subband-filtered and corrected phase history is $$\psi(K_X, K_R) = -X_t K_X - \delta R\sqrt{K_R^2 - K_X^2} - \frac{2\mu R_s \delta R K_R}{\sqrt{K_R^2 - K_X^2}} + \frac{2\mu R_s \delta R K_R^2}{K_R^2 - K_X^2} + \mu \Delta R^2$$

where $\delta R$ is the value of $\Delta R$ relative to the center of the range subband.

$$\delta R = \Delta R - SB_r\left(s - \frac{NSB_r - 1}{2}\right)$$

Step 6

The Stolt interpolation 17 transforms the phase history into a linear function of the range wavenumber variable. The coefficient is the range target coordinate, and the linearized phase history is ready for a compression fast Fourier transform (FFT) 18. In addition, the interpolation establishes the final range pixel spacing.

For fixed values of $K_X$, the interpolation transforms the variable $K_R$ into the variable $K_Y$. The forward and inverse equations connecting these two variables are $$K_Y = \sqrt{K_R^2 - K_X^2} + \frac{2\mu R_s K_R}{\sqrt{K_R^2 - K_X^2}} - \frac{2\mu R_s K_R^2}{K_R^2 - K_X^2}$$

$$K_R = \sqrt{K_X^2 + K_Y^2 - 4\mu R_s \sqrt{K_X^2 - K_Y^2} + \frac{4\mu R_s(K_X^2 + K_Y^2)}{K_Y}}$$

As a result of applying this transformation, the phase history becomes $$\psi(K_X, K_Y) = -X_t K_X - \delta R K_Y + \mu \Delta R^2$$

which is seen to be a linear function of the variable $K_Y$ with coefficient $\delta R$.

Step 7

The compression fast Fourier transform 18 produces range pixels. The range subbands are individually compressed, and the range pixels are concatenated over the subbands.

It is required that each range subband contains an integral number of range pixels. To ensure this requirement is met, the desired range pixel spacing can be slightly adjusted if necessary.

Step 8

A phase/gain equalization function 19 is applied to the outputs of the compression FFT 18. The application of this function guarantees no phase or amplitude discontinuities across the range subband boundaries. FIG. 6 shows a matrix representation of the data at the end of range processing. The ordered pair of indices identifies the data: the first is the range pixel index and the second is the pulse (azimuth) index.

The explicit form of the complex-valued phase/gain equalization function is derived by tracking both the phase and amplitude of the VPH data as it is processed in steps 4 to 7. The goal is to remove all phases and gains that were added to the data during range processing.

Step 9

Range processing produces all values of range for a fixed value of azimuth, but azimuth processing (steps 10 to 14) requires all values of azimuth for a fixed value of range. In other words, steps 4 to 8 produce all the range pixels for a fixed value of $K_X$, but steps 10 to 14 require all $K_X$ for a fixed range pixel. A second corner turn (global matrix transpose) 22 performs the necessary data shuffling. Rows become columns and vice versa. FIG. 7 shows a matrix representation of the data after the corner turn 22. The ordered pair of indices identifies the data: the first is the pulse (azimuth) index and the second is the range pixel index. The columns of this matrix are individually processed in steps 10 to 14.

Azimuth processing 30b is implemented in the next five steps. Azimuth subband processing 20b is one improvement provided by the present invention and involves subband filtering 15 and subband phase adjustment 16 identified as steps 10 and 11.

Step 10

The subband filtering 23 separates the entire patch width (in azimuth) into smaller pieces called azimuth subbands. This is necessary for the following reasons: (1) the range of valid (i.e. non-zero) samples drifts as the azimuth target coordinate varies, and (2) the input signal may not be bandlimited. FIG. 8 shows a matrix representation of the data after the subband filtering 23 for each value of range. The ordered pair of indices identifies the data: the first is the output sample index and the second is the subband filter FFT index. An azimuth frequency shift may be appended; with the addition of this frequency shift, the subband filtering FFT is indexed beginning with the output filter at dc.

Each azimuth subband is tuned to a specific value of $X_t$, the value at the center of the subband. Consecutive subbands are separated by $SB_a$. The equations are $$X_t = SB_a \left( s - \frac{NSB_a - 1}{2} \right)$$

$$SB_a = \frac{2\pi}{\Delta K_X NFFTSB_a}$$

where $\Delta K_X$ is the wavenumber sample spacing (the output of the along-track Fourier transform 12), $NFFTSB_a$ is the size of the azimuth subband filter FFT, $NSB_a$ are the number of subbands, and the subband index is $s=0,1,\ldots,NSB_a-1$.

Corresponding to each azimuth subband is a set of valid output samples. Each subband is identified by a particular subband index, and the corresponding range of valid samples can be computed and extracted for further processing. The valid sample selection tables are computed using the $K_X$ interval from the along-track Fourier transform 12; this interval gives the bounds of the non-zero data in wavenumber space.

Step 11

A subband phase adjustment 24 represents a correction that must be applied to the outputs of the subband filtering 23. The corrected phase history is in a form suitable for interpolation 25. The subband phase adjustment function is different for each azimuth subband.

The equation for the subband-filtered and corrected phase history is $$\psi(K_X) = -\delta X_t K_X$$

where $\delta X_t$ is the value of $X_t$ relative to the center of the azimuth subband.

$$\delta X_t = X_t - SB_a \left( s - \frac{NSB_a - 1}{2} \right)$$

Step 12

The interpolation step 25 establishes the final azimuth pixel spacing. The phase history is a linear function of the azimuth wavenumber variable. The coefficient is the azimuth target coordinate, and the linearized phase history is ready for a compression FFT 26.

The phase history is $$\psi(K_X) = -\delta X_t K_X$$

which is seen to be a linear function of the variable $K_X$ with coefficient $\delta X_t$.

Step 13

The compression fast Fourier transform 26 produces azimuth pixels. The azimuth subbands are individually compressed, and the azimuth pixels are concatenated over the subbands.

It is required that each azimuth subband contains an integral number of azimuth pixels. To ensure this requirement is met, the desired azimuth pixel spacing can be slightly adjusted if necessary.

Step 14

A phase/gain equalization function 27 is applied to outputs of the compression FFT 26. The application of this function guarantees no phase or amplitude discontinuities across the azimuth subband boundaries. FIG. 9 shows a matrix representation of the data at the end of azimuth processing and which corresponds to the output image data 28 from the range migration algorithm 10. The ordered pair of indices identifies the data: the first is the azimuth pixel index and the second is the range pixel index.

The explicit form of the complex-valued phase/gain equalization function is derived by tracking both the phase and amplitude of the VPH data as it is processed in steps 10 to 13. The goal is to remove all phases and gains that were added to the data during azimuth processing.

Thus, an improved scalable range migration algorithm for use in high-resolution, large-area synthetic array radar imaging systems has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A scalable range migration processing method for use in generating synthetic aperture radar image, comprising the steps of:

inputting video phase history data for processing derived from a synthetic aperture radar that corresponds to a two-dimensional array of complex-valued input data, comprised of pulses by samples;

processing the video phase history data using an along-track Fourier transform, to convert the input video phase history data to wavenumber space;

processing the data using a phase adjustment to apply a predetermined phase adjustment function to the data;

processing the data using a global matrix transpose to rearrange the data to produce values of range for a fixed value of azimuth;

processing the data using range subband processing to produce range pixels;

processing the data using a global matrix transpose to rearrange the data to produce values of azimuth for a fixed value of range;

processing the data using azimuth subband processing to produce azimuth pixels; and outputting image data to form a synthetic aperture radar image.

2. The method recited in claim 1 wherein the range subband processing comprises processing the data using range subband processing that separates the swath width into range subbands, adjusts the phase of the data, determines a range pixel spacing, produces range pixels, and equalizes the phase and gain of the range pixels.

3. The method recited in claim 2 wherein the range subband processing comprises the steps of:

processing the data using a subband filtering that separates the swath width into range subbands;

processing the data using a subband phase adjustment to correct outputs of the subband filter step;

processing the data using a Stolt interpolation that transforms the phase history into a linear function of the range wavenumber variable and establishes a final range pixel spacing;

processing the data using a compression fast Fourier transform to produce range pixels; and processing the data using a phase/gain equalization function applied to the outputs of the compression fast Fourier transform.

4. The method recited in claim 1 wherein the azimuth subband processing comprises processing the data using azimuth subband processing that separates the patch width into azimuth subbands, adjusts the phase of the data, determines an azimuth pixel spacing, produces azimuth pixels, and equalizes the phase and gain of the azimuth pixels.

5. The method recited in claim 4 wherein the azimuth subband processing comprises the steps of:

processing the data using a subband filtering that separates the patch width into azimuth subbands;

processing the data using a subband phase adjustment that corrects the outputs of the subband filtering step;

processing the data using an interpolation to establish a final azimuth pixel spacing;

processing the data using a compression fast Fourier transform to produce azimuth pixels; and processing the data using a phase/gain equalization function applied to the outputs of the compression fast Fourier transform to produce output image data.

6. A scalable range migration processing method, for use in generating synthetic aperture radar image, comprising the steps of:

inputting video phase history data for processing derived from a synthetic aperture radar that corresponds to a two-dimensional array of complex-valued input data, comprised of pulses by samples;

processing the video phase history data using an along-track Fourier transform, to convert the input video phase history data to wavenumber space;

processing the data using a phase adjustment to apply a target-independent phase adjustment function to the data;

processing the data using a global matrix transpose to rearrange the data to produce values of range for a fixed value of azimuth;

processing the data using a subband filtering that separates the swath width into range subbands;

processing the data using a subband phase adjustment to correct outputs of the subband filter step;

processing the data using a Stolt interpolation that transforms the phase history into a linear function of the range wavenumber variable and establishes a final range pixel spacing;

processing the data using a compression fast Fourier transform to produce range pixels;

processing the data using a phase/gain equalization function applied to the outputs of the compression fast Fourier transform;

processing the data using a global matrix transpose to rearrange the data to produce values of azimuth for a fixed value of range;

processing the data using a subband filtering that separates the patch width into azimuth subbands;

processing the data using a subband phase adjustment that corrects the outputs of the subband filtering step;

processing the data using an interpolation to establish a final azimuth pixel spacing;

processing the data using a compression fast Fourier transform to produce azimuth pixels; and processing the data using a phase/gain equalization function applied to the outputs of the compression fast Fourier transform to produce output image data.

7. The method recited in claim 6 wherein the along-track Fourier transform processing step integrates each sample along the pulses for a fixed value of range.

8. The method recited in claim 7 wherein the along-track Fourier transform processing step decouples range and azimuth target coordinates.

9. The method recited in claim 6 wherein the global matrix transpose produces ordered pairs of indices that identify the data, wherein the first is the sample index and the second is the pulse index.

10. The method recited in claim 6 wherein the subband filtering produces ordered pairs of indices that identify the data, wherein the first is the output sample index and the second is the subband filter FFT index.

11. The method recited in claim 6 wherein the Stolt interpolation produces a phase history that is a linear function of a range wavenumber variable and establishes the final range pixel spacing.

12. The method recited in claim 6 wherein the compression fast Fourier transform produces range pixels, wherein range subbands are individually compressed and range pixels are concatenated over the subbands.

13. The method recited in claim 6 wherein the phase/gain equalization guarantees no phase or amplitude discontinuities across range subband boundaries.

14. The method recited in claim 6 wherein the phase/gain equalization output data comprises ordered pairs of indices that identify the data, wherein the first is the range pixel index and the second is the pulse index.

15. The method recited in claim 6 wherein the global matrix transpose produces ordered pairs of indices that identify the data, wherein the first is the pulse index and the second is the range pixel index.

16. The method recited in claim 6 wherein the subband filtering produces ordered pairs of indices that identify the data, wherein the first is the output sample index and the second is the subband filter FFT index.

17. The method recited in claim 6 wherein the interpolation establishes the final azimuth pixel spacing.

18. The method recited in claim 6 wherein the compression fast Fourier transform produces azimuth pixels, wherein azimuth subbands are individually compressed and azimuth pixels are concatenated over the subbands.

19. The method recited in claim 6 wherein the phase/gain equalization guarantees no phase or amplitude discontinuities across azimuth subband boundaries.

20. The method recited in claim 6 wherein the output image data comprises ordered pairs of indices identifying the data, wherein the first is the azimuth pixel index and the second is the range pixel index.

* * * * *